Feb. 23, 1965

J. W. BRUNDAGE 3,170,187

TIRE CURING PRESS WITH DUAL POST INFLATORS

Filed May 23, 1960

INVENTOR.
JAMES W. BRUNDAGE
BY
Oberlin, Maky & Donnelly
ATTORNEYS

Feb. 23, 1965 J. W. BRUNDAGE 3,170,187
TIRE CURING PRESS WITH DUAL POST INFLATORS
Filed May 23, 1960 5 Sheets-Sheet 2

INVENTOR.
JAMES W. BRUNDAGE
BY
Oberlin, Maky & Donnelly
ATTORNEYS

INVENTOR.
JAMES W. BRUNDAGE
BY
Oberlin, Maky & Donnelly
ATTORNEYS

Feb. 23, 1965    J. W. BRUNDAGE    3,170,187
TIRE CURING PRESS WITH DUAL POST INFLATORS
Filed May 23, 1960    5 Sheets-Sheet 4

INVENTOR.
JAMES W. BRUNDAGE
BY
Oberlin, Maky & Donnelly
ATTORNEYS

United States Patent Office 3,170,187
Patented Feb. 23, 1965

3,170,187
TIRE CURING PRESS WITH DUAL
POST INFLATORS
James W. Brundage, Akron, Ohio, assignor to NRM Corporation, a corporation of Ohio
Filed May 23, 1960, Ser. No. 30,989
22 Claims. (Cl. 18—2)

This invention relates as indicated to a tire curing press with dual post inflators and more particularly to a press and post inflation apparatus whereby tires using a fabric having shrinkage characteristics as, for example, nylon, Dacron, etc., may expediently be constructed.

In the production of nylon or like fabric tires, when such tires are removed from the tire curing press molds, there is a tendency for such fabric to shrink when cooling. This shrinkage results in a distortion which can be so extreme that the tires in which it appears are not saleable. Moreover, such fabric as nylon cord has a drawing stretch of around 400% and tire manufacturers have found it necessary to subject the cord to additional stretch in order to prevent tires in which such cord is used from growing or increasing its size during service. Excessive growth, of course, causes tire failures due to cracking, ply separation, etc.

Heretofore, tires have been cooled in the vulcanizing mold presses while the tires were still subjected to internal pressure or inflation in order to alleviate the above-mentioned distortion problems. The cooling of the tire within the mold is, of course, time consuming and expensive since such ties up the operation of the mold as a vulcanizing press for a considerable length of time. I have found that tires of such nylon cord fabric should be subject to a cooling period at ambient room temperature for a period approximately twice that required for one cycle of operation of a tire curing press. Thus, to cure properly a tire in the above-indicated manner would consume three cycles of operation of the tire press for proper treatment of one tire. Additionally, it is undesirable to cool the press while performing the post-inflation of the tire since additional time and expense must be taken to reheat the press after the post-inflation operation, thus further increasing the length of time involved for one complete cycle of operation of a press used in such a manner.

In the case of such nylon or like tires, it has been found desirable to cool the cured tire while the cords thereof are under tension, but accordingly, after the tire has been stripped from the molds of the curing press. Reference may be had to the copending application of James W. Brundage and Edwin E. Mallory, Serial No. 732,531, filed May 2, 1958, now Patent No. 3,065,499 entitled "Tire Handling and Curing Press" assigned to National Rubber Machinery Company of Akron, Ohio, for a disclosure of a post-inflation device in which such nylon or like cord tires are cooled under tension after such tires have been stripped from the curing press.

However, since the length of time required to cool a tire at room temperature while subjecting the cords thereof to tension has been found to be approximately twice the cycle of the curing press, it has been found desirable to provide a "dual" post-inflation device to operate in conjunction with such press whereby the tires having such nylon cord may be subjected to a cooling while the cords thereof are under tension for a period of time approximately twice that required to cure a tire carcass in such curing press. Accordingly, with a post-inflator of the type that I have devised, the cycle of operation of the tire curing press will remain unaffected due to the longer cycle time required for the cooling and post-inflation of such nylon cord tires.

It is accordingly a principal object of my invention to provide an apparatus for producing such nylon or like cord tires wherein the tire curing press cycle will remain substantially unaffected by the longer length of time required for the post-inflation and cooling of such tires.

It is a further object of my invention to provide an improved post-inflation device for a tire curing press which will enable the tire curing press to operate at the maximum possible speed.

It is a still further object of my invention to provide a dual post-inflator device whereby the post-inflating and cooling operation may be accomplished at ambient temperature and yet still not in any way reduce the productive capacity of the curing press.

It is a yet further object of my invention to provide a dual post-inflator device which may conveniently and easily be installed on a tire curing press thereby greatly to increase the productive capacity of the same.

It is yet another object of my invention to provide a dual post-inflator which may service any number of tire curing presses.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 1:
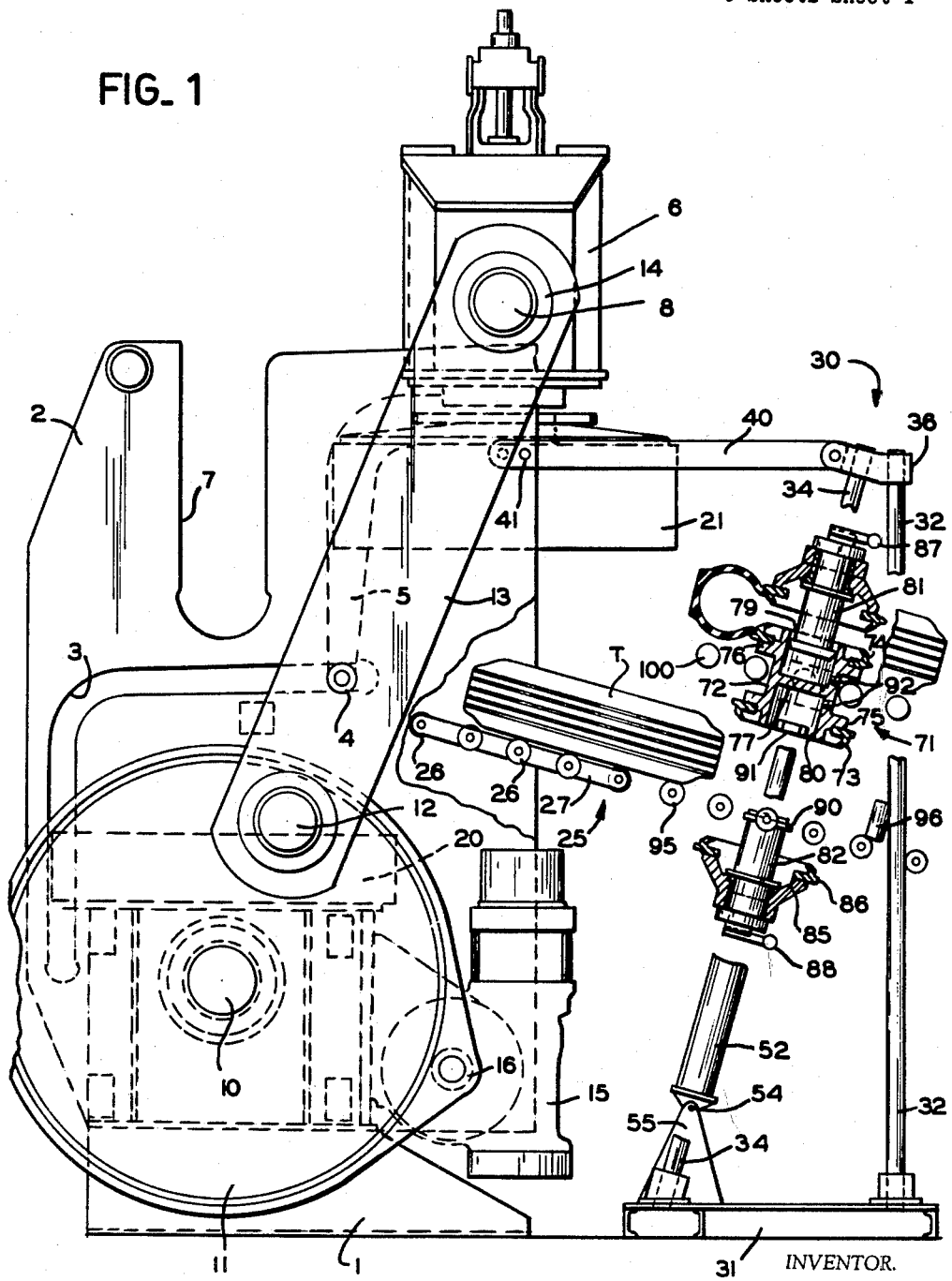
FIG. 1 is a fragmentary side elevational view partially in section disclosing one form of my dual post-inflator affixed to a tire curing press.

Referring now in detail to the drawings, the tire handling and curing mechanism hereindisclosed will be discussed in detail under the following headings:

(1) The Tire Curing Press in General (FIG. 1)

Figures 5, 8, 9, 10:
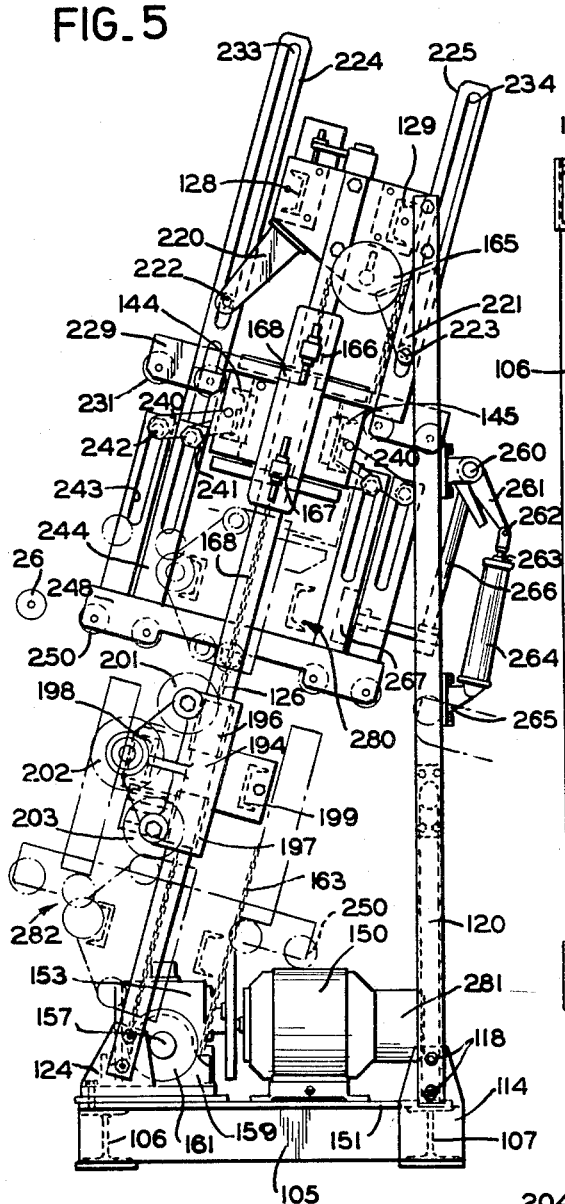
FIG. 5 is a fragmentary side elevational view of another form of my dual post-inflation device.
FIG. 8 is a fragmentary detail view of the base frame of the FIG. 5 embodiment.
FIG. 9 is a fragmentary detail sectional view of the left hand guide of FIG. 6.
FIG. 10 is a fragmentary detailed view taken substantially on the line 10—10 of FIG. 6 with parts removed for clarity of illustration.

(2) The FIG. 1 Embodiment of My Dual Post-Inflators
(3) The FIG. 5 Embodiment of My Dual Post-Inflators
(4) The Bead Ring Structures (FIGS. 11 and 12)
(5) Operation of FIG. 5 Embodiment

THE TIRE CURING PRESS IN GENERAL (FIG. 1)

The press hereindisclosed comprises a base 1 having upstanding cam plates 2 secured to the opposite sides thereof, each of which is formed with a first guide slot 3 for a guide roller 4 on a depending bracket 5 secured to the upper press head 6, such first slot 3 including a vertically extending portion and a generally horizontal portion as shown. Cam plate 2 is also formed with a second guide slot 7 including a vertically extending portion and a generally horizontally extending top portion, such top portion having the top of the slot omitted. The guide slot 7 in each plate 2 at the sides of the press accommodates shafts 8 for movement through a generally L-shaped path corresponding to the shape of the guide slot 7.

Journalled in each of the base 1 is a stub shaft 10 of a bull gear crank 11 and pivotally secured to the crank pin 12 thereof is the lower end of a crank link 13, the upper end of such link 13 being pivotally secured on the shaft 8 at the respective end of the press head 6. As shown, the press head 6 extends between the end plates 2 and preferably each shaft 8 thereof has a guide bushing 14 thereon which is in close sliding fit to the vertical portion of slot 7.

The bull gear cranks 11 are driven by electric motor driven gear reducers 15, the output shafts of which each have a pinion 16 in mesh with the teeth of the corresponding bull gear crank.

The press is shown in its FIG. 1 position as opened with the crank pins 12 being near the top and the links 13 disposed in an inclined position. The rollers 4 which are carried by the brackets 5 depending from the press head 6 are disposed adjacent the ends of the horizontal portions of the guide slots 3 and similarly, the shafts 8 of the press head 6 are disposed adjacent the ends of the horizontal top portions of the guide slots 7.

The base 1 of the press carries a pair of bottom mold sections 20 in side-by-side relationship, each of which, as well-known in the art, is formed with an annular cavity which constitutes the molding surfaces for the bottom bead, the bottom side wall, and the lower half of the tread, or skid portion of a tire. Each mold section 20 is provided with a toe ring over which the bottom bead of a pulley band carcass is adapted to be positioned and, of course, each mold section has a heating platen thereunder.

The press head 6 likewise carries a pair of side-by-side downwardly facing top mold sections 21 which, like the bottom mold sections 20, each define an annular cavity providing the molding surfaces of the top bead, the top side wall, and the upper half of the tread, or skid portion of the tire. Again, a heating platen is interposed between each top mold section 21 and the press head 6.

When the press is in closed position, the top and bottom mold sections 20 and 21 are in mating engagement thereby forming a tire shaped cavity therebetween in which a tire T is adapted to be cured to final shape by circulation of curing medium such as hot water or steam under pressure through the interior of the tire carcass. When the press is in its closed position, the crank pins 12 will be at the bottom with the links 13 disposed in a generally vertical position. The rollers 4 which are carried by the brackets 5 depending from the press head will be disposed adjacent the bottoms of the vertical portions of the guide slots 3 and similarly the shafts 8 of the press head 6 will be disposed adjacent the bottoms of the vertically disposed portions of the guide slots 7. Thus the bull gear cranks 11 will be rotated in a counterclockwise direction to position the pins 12 to move the head to its closed position. It can readily be seen that the roller 4 within the slot 3 which is attached by means of bracket 5 to the head 6 will maintain the upper mold section 21 always substantially parallel to the lower mold section 20.

It is noted that when the press is in its open position shown, the space above the bottom mold section 20 is unobstructed so that a pulley-band carcass may easily be positioned from overhead and in upright position around the toe ring of the bottom mold section. Also, in the open position, the top mold section 21 is laterally offset from the bottom mold section 20 such that the cured tire may be dropped therefrom by a convenient stripping mechanism to be placed upon a discharge path defined by conveyor 25 to be moved from the press. Accordingly, the unloading conveyor 25 comprises a downwardly and rearwardly tilted platform carrying anti-friction rollers 26 which may be supported by bars 27 pinned to the respective end plates of the tire press.

The hereinabove described tire press is a Slide-Back Autoform vulcanizer which is manufactured and sold by National Rubber Machinery Company of Akron, Ohio, to tire manufacturers for producing tires uniformly in great quantity. Reference may be had to the above-mentioned copending application of Brundage et al. for a more complete description of this tire press.

When the tire T leaves the vulcanizing press, it is yet in highly heated condition and as a result, in the case of nylon cord or like tires, it has been found desirable to cool the cured tire while the cords thereof are under tension. Of course, the most economical way to cool such cured tires is to expose the same to ambient or room air, such air being at a temperature substantially less than the temperature of the vulcanized tire. In order properly to cool such tire, it has been found that a length of time substantially equal to two cycles of the curing press is required to reduce the temperature of the tire to such room temperature wherein the cords thereof may be released from the tension required during such cooling operation.

Thus, I have provided a dual post inflation device for use with such tire press, one illustrated form of which may be seen in FIG. 1 generally shown at 30.

DUAL POST INFLATION DEVICE (FIG. 1 EMBODIMENT)

Figure 3:
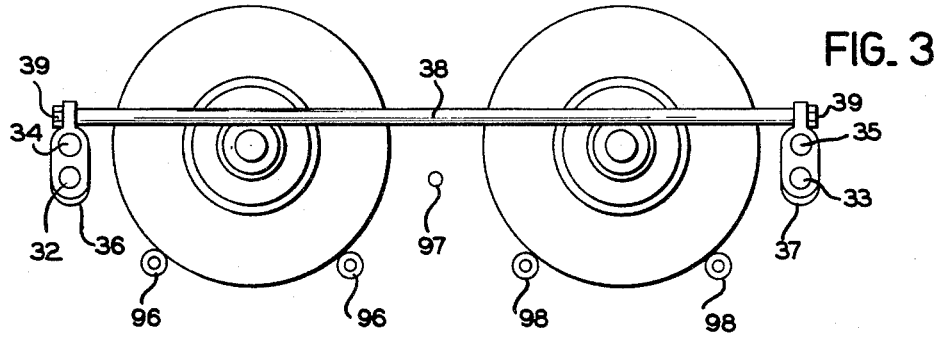
FIG. 3 is a fragmentary somewhat schematic top plan view of the apparatus shown in FIG. 2.

The FIG. 1 dual post inflation device may comprise a base 31 having four upright support members 32, 33, 34 and 35 supported thereon with the upright members 32 and 33 extending normal to such base 31 and the upright members 34 and 35 extending inclined thereto but normal to the path of conveyor 25. The upright members are secured together at the tops thereof as seen more clearly in FIG. 3 with the members 32 and 34 being held by bracket member 36 and the members 33 and 35 being held by bracket member 37. Each such bracket member is provided with a forwardly extending portion through which a transverse frame member 38 is secured as by nuts 39. Further brace members 40 may be provided secured to each side of the supporting structure and also secured as shown at 41 to each of the side plates 2 of the tire curing press. It can now be seen that my FIG. 1 embodiment of such dual post inflators is firmly secured to the rear of the machine to accommodate tires coming from the press in a manner now to be described.

Figures 2, 4:
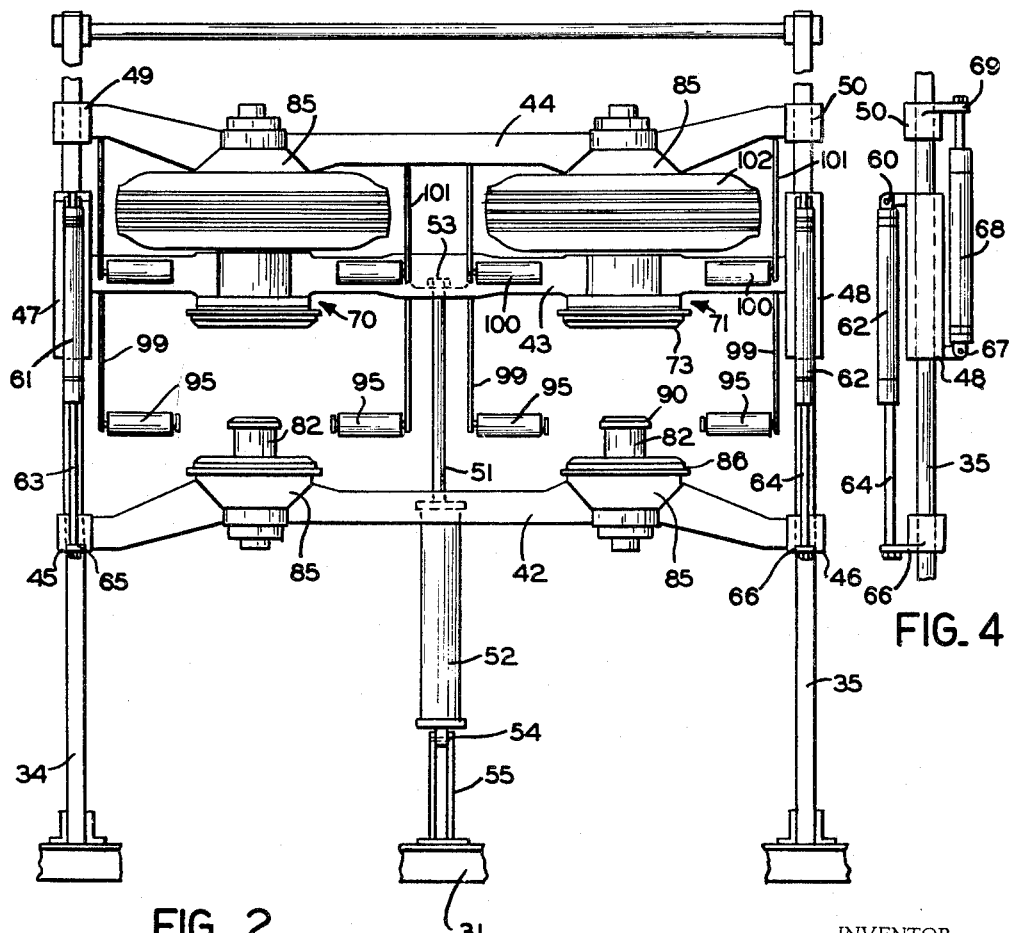
FIG. 2 is a fragmentary end elevational view of such dual post-inflator as seen from the right along the conveyor in FIG. 1.
FIG. 4 is a fragmentary side elevational view of the apparatus of FIG. 2 illustrating the position of the various actuating cylinders.

Each of the inclined vertical support members 34 and 35 constitute guides for the vertical movement of three transverse frame members 42, 43 and 44 extending therebetween as shown more clearly in FIG. 2. The opposite ends of the transverse members 42 are provided with bearings surrounding and enclosing the uprights 34 and 35 as shown at 45 and 46 whereby such may move readily along the uprights 34 and 35. The opposite ends of the transverse member 43 are also provided with enlarged portions 47 and 48 surrounding the uprights 34 and 35 and are provided with bearings in the conventional manner to facilitate the vertical movement of such member 43 along the guides 34 and 35. Likewise, the top transverse member 44 is also provided with enlarged end portions 49 and 50 having suitable bearings therein to facilitate the movement of such transverse member along the guides 34 and 35.

The middle or intermediate transverse member 43 has the rod 51 of piston-cylinder assembly 52 affixed thereto as shown at 53. The blind end of the piston-cylinder assembly is mounted as shown at 54 on upstanding ears 55 supported on base 31. Such piston-cylinder assembly 52 is positioned intermediate the guides 34 and 35 and extends generally parallel thereto. For this reason, it can be seen that the central transverse member 43 is mounted for reciprocation along the guides 34 and 35 by means of the piston-cylinder assembly 52.

As shown more clearly in FIG. 4 on opposite ends of the elongated enlarged portions 47 and 48, I pivotally mount pairs of piston-cylinder assemblies to move the respective transverse frame members 42 and 44 with respect to the intermediate or central transverse frame member 43. Mounted on the back of each of the enlarged portions 47 and 48 as at 60 are two piston-cylinder assemblies 61 and 62, the rods 63 and 64 of which are secured to extensions 65 and 66 on the enlarged end portions 45 and 46 respectively of the lower transverse member 42. Accordingly, it will be seen that the transverse frame member 42 is mounted by means of the piston-cylinder assemblies 61 and 62 for reciprocation along the guides 34 and 35 with respect to the intermediate transverse frame member 43.

Pivotally mounted on the bottom of the enlarged portions 47 and 48 as at 67 are a pair of similar piston-cylinder assemblies 68, the rods of which are fixed to the extensions 69 on the enlarged end portions 49 and 50 of the top transverse frame member 44. In the same manner, the top transverse frame member 44 is mounted on the guides 34 and 35 for reciprocation toward and away from the intermediate transverse frame member 43 by means of such piston-cylinder assemblies 68. It can now be seen that the entire assembly is mounted for movement along the guides 34 and 35 by means of the main piston-cylinder assembly 52 and that the other transverse frame members 42 and 44 are mounted for movement with respect to the intermediate frame member 43 by means of the separate pairs of piston-cylinder assemblies mounted on the enlarged portions 47 and 48 of such intermediate frame member. It will, of course, be understood that the transverse frame member 42 may either be apertured or bowed slightly to by-pass the piston-cylinder assembly 52 such that the transverse frame member will have complete freedom of movement therepast.

Mounted on the central transverse frame member 43 are oppositely facing pairs of rim inflating assemblies cooperating with similar rim inflating assemblies on the transverse frame members 42 and 44 to seal the tires as they come from the curing press such that they may be inflated with air under pressure to maintain the nylon or like cords therein under tension during the cooling thereof at ambient temperature. As shown perhaps more clearly in FIG. 1, each of the tire confining structures 70 and 71 mounted on the transverse frame member 43 comprises a tubular-shape member 72 having annular bead rings 73 and 74 oppositely facing on respective flanges 75 and 76 to engage the tire in a manner hereinafter described. A central web 77 separates the two recesses or cavities 79 and 80, the oppositely facing recesses 79 and 80 accommodating, respectively, projecting portions 81 and 82 mounted on the rim structures positioned on the top frame member 44 and the bottom frame member 42 respectively. Each of these structures includes bell-shape supports 85 upon which are positioned bead rings 86 substantially identical in form to the bead rings 73 and 74 mounted on the interior or central rim structures. Each of the projections 81 and 82 are mounted on the respective supporting structures of the transverse frame members for rotational movement by piston-cylinder assemblies 87 and 88 which may drive rack and pinions or other suitable mechanisms whereby the extensions 81 and 82 may be rotated to provide a bayonet lock when they are inserted within the respective cavities 79 and 80 of the rim structures on the central transverse member 43. As shown, each of the central projections 81 and 82 is provided with an overhanging annular lip portion 90 which is slotted such that projections 91 within the recesses in the rim structures on the transverse central frame member will lock behind such lip 90 when the projection is rotated by the piston-cylinder assembly 88. Thus a bayonet type of lock is provided once the opposed bead lip structures are brought into tire engaging position.

The center projections 81 and 82 are provided with an air seal with their respective bell-shape supports such that when the bead rings are brought into tire engagement, the interior of the tire will be airtight so that it can be pressurized by air conduits connected, for example, as at 92.

As shown in FIG. 1, the conveyor or rollers 95 constitute an extension of the conveyor rollers 26 of the inclined conveyor 25 such that the tire T will roll directly from such conveyor 25 onto the rollers 95 to be brought to a stop by abutments 96 positioned in the path of the tire. These abutments may be pivoted about the inclined supports and an intermediate pivot 97 also supporting abutments 98 for the other tire coming from the dual press. When the tires are halted in their inclined downwardly directed path by such abutments, they will be generally aligned with the separated bead rings 73 and 86. The rollers 95 are in reality opposed pairs of such rollers mounted on depending brackets 99 from the central transverse frame member 43 and, of course, are thus movable therewith. Once the heated tires are brought into the proper position against the abutments 96 and 98, the piston-cylinder assemblies 61 and 62 will retract the piston rods 63 and 64 to draw the transverse frame member 42 upwardly to lift the tires off the conveyor rollers 95 and clamp the tires between the bead rings 73 and 86. Actuation of the piston-cylinder assembly 88 will then rotate the projections 82 to lock such bead rings together providing an airtight enclosure for the tires. Such tires T are then inflated to the desired pressure to keep the tire cords under the desired tension. The tires may be inflated to an internal pressure of approximately 30 pounds and this pressure retained until the temperature of the tire falls below the temperature at which the nylon or like cords will heat shrink, such being approximately 250° F. However, since the time required for this cooling at ambient temperature is considerably more than the period of time of one cycle of the tire press, I have provided a means to retain such tires under tension without slowing the productive capacity of the tire press.

Mounted on the top transverse frame member 44 are conveyor rollers 100 identical in form to the conveyor rollers 95 mounted on the intermediate transverse frame member, these rollers 100 being mounted by depending brackets 101 in a similar fashion to the conveyor rollers 95. Once a hot tire has been secured between the bead rims 86 and 73, the entire mechanism will be moved downwardly by actuation of the piston-cylinder assembly 52 to retract the rod 51 to bring the tire mechanism downwardly until the bead ring 74 shown in FIG. 1 is in the position formerly occupied by the bead ring 86. In this position, the tire 102 which has been cooling during the previous cycle of the tire press will now be in a position to be removed and again, placed upon the inclined conveyor to be transferred to storage, etc. Shortly before the end of the next cycle of the tire curing press, the piston-cylinder assemblies 68 will be actuated to raise the top transverse frame member 44 after the tire 102 has been deflated then to position the conveyor rollers 100 upwardly in the position that the rollers 95 are shown in FIG. 2. This will then clear or strip the tire from the bead ring 74 and once the rollers 100 are in a position to constitute a continuation of the conveyor 25, the tire 102 will roll clear of the post-inflation device. Once the tire is removed by the conveyor, the stops 96 and 98 will again be positioned to stop the hot tires coming from the tire press at the end of the next cycle. Once the hot tires are stopped, retraction of the piston-cylinder assemblies 68 will bring the top transverse frame member downwardly and actuation of the piston-cylinder assemblies 87 will rotate the projections to provide the bayonet lock to confine or provide an airtight chamber for the hot tires. Once these tires are placed under pressure they will then be elevated by extension of the rod 51 of the piston-cylinder assembly 52 bringing the lower tires again to the conveyor position where such will be discharged prior to the completion of the next press cycle by actuation of the piston-cylinder assemblies 61 and 62. It can thus be seen that this form of my dual post inflation device provides a cooling period for the hot tires coming from the press which will be substantially twice that required for the vulcanizing operation of the press itself.

FIGURE 5 EMBODIMENT (FIGS. 5 THROUGH 10)

Referring now to a preferred form of my invention illustrated in FIGS. 5 through 9 inclusive, and referring first to FIG. 5, it will be seen that such embodiment is mounted on a base 105 having transverse structural members 106 and 107 interconnected by side plates 108 and 109 as well as an intermediate member 110 and diagonal braces 111 and 112 (see particularly FIG. 8). Mounted at the two rear corners of the frame 105 are two upstanding plates 113 and 114 to which are secured upstanding vertical support members 115 and 116 as by the nut and bolt assemblies shown at 117 and 118 respectively. Diagonal supports 119 and 120 are employed to brace such upright members 115 and 116 rigidly vertically to support the same.

At the front corners of the base frame 105, I provide two bed plate members 121 and 122 supported on plates on the corners of the frame, each having upstanding gusset plate-like portions 123 and 124 to which inclined vertical guide members 125 and 126 are secured. (Note FIG. 6.) A top transverse frame member 127 composed of two channel members 128 and 129 is firmly secured as by the nut and bolt assemblies shown to each of the upstanding vertical members 125, 126 and 115, 116. Thus a rigid A-like frame is provided on the base structure which firmly supports the component parts of my dual post inflator for movement along the guides 125 and 126.

Secured to the top transverse frame member 128 are two tire inflating rim devices 130 and 131 which are identical in form and quite similar to the inflating rim devices 85 mounted on the top transverse frame member 44 of the FIG. 1 embodiment of my invention. Each of the inflating rim devices is mounted on the top transverse frame member 127 by means of downwardly projecting rods 132 which may, if desired, be surrounded by compression springs 133 whereby such inflating rim devices may be resiliently moved toward the top transverse frame member for a limited distance. Each device also includes a center rotatable shaft 134 connected to a linkage 135 actuated by the rod 136 of piston-cylinder assembly 137, the blind end of such assembly being connected as at 138 to the top transverse frame assembly 127. Thus the cylinder assembly 137 may be actuated to rotate central projections 139 within each of the inflating rim assemblies whereby a bayonet lock may be provided as shown at 140 with the opposed inflating rim assemblies 141 and 142 mounted on an intermediate movable transverse frame member 143. Each of the inflating rim assemblies including an annular bead-engaging structure identical in form to the bead-engaging structures shown in the FIG. 1 embodiment which will hereinafter be more fully described.

The inclined guide 125 is of square cross section and the inclined guide 126 is of circular cross section and both provide guide means for the reciprocation therealong of the intermediate transverse frame member 143.

Such intermediate transverse frame member may include a pair of transversely extending structural frame members 144 and 145 in a manner similar to the top transverse frame member. As seen more particularly in FIGS. 5 and 6, the right hand side of such transverse member 143 is elongated and enlarged to provide a bearing 146, which may, for example, be a bronze bushing at one end and a similar bearing 147 at the opposite end. Thus, the transverse frame member is precluded from canting on the guide 126 and can readily be moved therealong. The opposite end of such transverse frame member 143 is enlarged as shown at 148 to enclose the square sectional guide 125 such that the tire frame may be slid therealong. (Also note FIG. 9.)

In order to impart movement to such transverse frame member along the guides 125 and 126, I provide the drive motor 150 mounted on a plate 151 on the base frame 105, such plate including a slide base 152 along which the motor may be adjustably positioned.

The motor 150 drives a speed reducer 153 of the cone shaft type, reducing the speed of the motor in approximately a 50 to 1 ratio. The drive described is accomplished by belt 154 and sheaves 155 and 156 mounted on the motor and speed reducer respectively. The slide 152 thus maintains adjustably the proper tension on the belt 154 in a conventional manner.

The speed reducer drives transverse shaft 157 mounted in pillow blocks 158 and 159 secured respectively to the bed plates 121 and 122. Mounted on the opposite ends of the shaft 157 are sheaves 160 and 161 driving respectively chains 162 and 163. Such chains are respectively entrained around sheaves 164 and 165 mounted on the top frame structure of my dual post inflation device. The opposite ends of the chain 163 are adjustably secured as shown at 166 and 167 to the elongated guide housing 168 of the transverse frame member 143. The chain 162 is adjustably secured as at 169 and 170 to the member 148 of transverse frame 143 enclosing the guide 125. Thus, depending upon the direction of rotation of the motor 150, the transverse frame member will be caused to move upwardly or downwardly along the guide 126. By the adjustment means 169, 170 and 166, 167, the tension of both chains 162 and 163 can closely be controlled. It can now be seen that the transverse intermediate frame member 143 is mounted for movement along the guides 125 and 126 by the chain drive driven by motor 150.

In a manner similar to the intermediate transverse frame member 43 of the FIG. 1 embodiment, the transverse frame member 143 includes two tire rim inflating assemblies 180 and 181 which are substantially identical in form to the assemblies 70 and 71 of the FIG. 1 embodiment. Such assemblies are, however, secured directly between the structural frame members 144 and 145 as by bolts shown at 182. Also, air union couplings may be provided at 183 and 184 connecting such inflating structures to a source of air pressure as through, for example, flexible hoses. The downwardly facing inflating rim structures 185 and 186 cooperate with upwardly facing inflating rim structures 187 and 188 mounted on lower transverse frame member 189. These structures are essentially identical in form to the structures 85 on the lower transverse frame member 42 in the FIG. 1 embodiment and include center projections 190 and 191 which may be rotated by a linkage 192 actuated by piston-cylinder assembly 193, the blind end of which is mounted on the end portion 194 of the transverse frame member 189 as shown at 195. Thus by actuation of the piston-cylinder assembly 193, the projections 190 and 191 may be rotated to provide a bayonet lock in a manner identical to that shown at 140. Of course, each of the projections extending from the rim inflating assemblies is provided with suitable air seals such that when such assemblies are brought together they will form a completely airtight chamber within the enclosed tire.

The end portion 194 of the lower transverse frame 189 has an enlarged tubular portion having bearings 196 and 197 to enable such transverse frame member freely to slide along the guide 126. (Note FIG. 5.) Like the top and intermediate transverse frame members, the lower transverse frame member 189 includes two transverse structural channel-shaped members 198 and 199 thus to provide a completely rigid transverse structure. The opposite end of the frame member 189 is provided with a similar enlarged portion 200 enclosing the guide 125 so that such may freely ride therealong. (Note FIG. 10.)

As will be seen from a comparison of FIGS. 5 and 9, each of the end portions 194 and 200 is provided with mounts for three sheaves, the end portion 194 having sheaves 201, 202 and 203 thereon which are freely rotatable. The chain 163 is trained about the bottom of sheave 203 and over the top of sheave 202 and thence around the bottom of sheave 201 to be adjustably attached at 167 to portion 168 of the transverse frame member 143. The member 200 is also provided with mountings 204, 205 and 206 similarly to provide three sheaves such that the chain 162 will pass therearound in a manner identical to the sheaves 201, 202 and 203 mounted on the end portion 194.

The bottom transverse frame member is interconnected with the intermediate transverse frame member by means of pneumatic piston-cylinder assembly 210, the blind end of which is pivoted as shown at 211 to the bottom frame 189. The rod 212 is secured at 213 to a plate 214 projecting above the intermediate frame 143 with the rod 212 passing between the channel frame members 144 and 145. In this manner, when the piston-cylinder assembly 210 is retracted, the rod end will assume the position shown in dotted lines at 215. Of course, such retraction of the cylinder will bring the transverse frame member 189 upwardly to bring the inflating rim assemblies thereon in mating engagement with the downwardly facing inflating rim assemblies on the intermediate transverse frame member 143.

It can now be seen that the top transverse frame member 128 is stationary and mounts thereon inflating rim assemblies 130 and 131; that the intermediate transverse frame member is movable along the guides 125 and 126 by means of the chain drives 162 and 163; and that the lower transverse frame member 189 is movable with respect to and, of course, with the intermediate transverse frame member 143 by means of the piston-cylinder assembly 210. The sheaves on the ends of such lower frame member 189 permit relative movement of the intermediate and lower frame members without affecting the position of the intermediate frame member. Thus the lower and intermediate frame members may be moved as a unit by means of the chain drives or the lower frame member 189 may be moved with respect to the intermediate frame member 143 by means of the piston-cylinder assembly 210.

In order to provide an extension for the conveyor 25 leading from the tire curing press as shown in FIG. 1 with the conveyor rollers 26 guiding the heated tire from such press, I provide two conveyor sections, one for the upper pairs of mating rim inflation devices and also one for the lower pairs of rim inflation devices.

Rigidly secured to the top transverse frame member 128, I provide a series of depending brackets 220 and 221 having guide stops 222 and 223 respectively thereon. Such guide stops fit within elongated slots on upstanding guide members 224 and 225 respectively. These series of vertically extending guide members 224 and 225 are fixed to side frame members 226, and 227, 228 and 229, with the conveyor rollers 230 being secured between the side frame members 226 and 227 and the conveyor rollers 231 being secured between the side members 228 and 229. Such conveyor rollers serve to support the tire coming from the tire curing press in the same manner as the conveyor rollers 100 in the FIG. 1 embodiment. The side frame members 226 through 229 inclusive are supported on the intermediate transverse frame member 143 and will move upwardly and downwardly therewith to the extent of the elongated slots in the upstanding members 224 and 225. As the central transverse frame member 143 moves downwardly as the result of the actuation of the chain drives 162 and 163, the top portions 233 and 234 of the slots of the guides 224 and 225 respectively will contact the stops 222 and 223 to position the conveyor rollers 230 and 231 at the proper position opposite the conveyor roller 26 to receive a tire coming from the tire curing press. At this point, however, the central transverse frame member 143 will have moved further downwardly such that the stops 222 and 223 will, in effect, lift the frame members 226 through 229 inclusive off the central transverse frame member such that a tire rolling thereon will clear the rim inflating assemblies 141 and 142.

Brackets 240 and 241 secured to the central transverse frame member 143 similarly mount thereon guide stops 242 fitted within elongated slots 243 in vertically extending guide members 244. Such guide members are secured at their bottoms to conveyor side frame members 245, 246, 247 and 248. Positioned intermediate the frame members 245 and 246 are conveyor rollers 249 and between the side frame members 247 and 248, conveyor rollers 250. Thus the conveyor rollers 249 and 250 are mounted for limited vertical movement with respect to the central transverse frame member 143, the limit of this movement being the extent of slots 243. The movement of the rollers 249 and 250 is caused by the actuation of piston-cylinder assembly 210 moving the lower transverse frame member 189 upwardly to contact the side frame members 245 through 248 inclusive thus to move the conveyor rollers upwardly with respect to the intermediate frame member 143. In the full line position show in FIG. 5, the conveyor rollers 250 are in position to constitute a continuation of the discharge conveyor of the tire curing press.

As seen in FIG. 5, mounted transversely of the upright members 115 and 116 is a shaft 260 having a crank 261 secured thereto. Such crank is pivotally connected as at 262 to the piston 263 of piston-cylinder assembly 264. The blind end of this piston-cylinder assembly is secured to the upright member 116 as shown at 265. Also secured to the shaft 260 is a depending bracket 266 which mounts thereon stop abutments 267 positioned such that hot tires coming from the tire curing press and rolling down the discharge conveyor will contact the same to be halted and centered in a position such that my rim inflation devices may be actuated to seal such tire for post inflation. The actuation of piston-cylinder assembly 264 will rotate the shaft 260 thus to swing the stops 267 clear of a tire after such has been discharged from my rim inflating devices such that the tire may continue on its way down the dischrage conveyor to storage, etc.

THE BEAD RING STRUCTURES (FIGS. 11, 12 AND 13)

Figure 11:
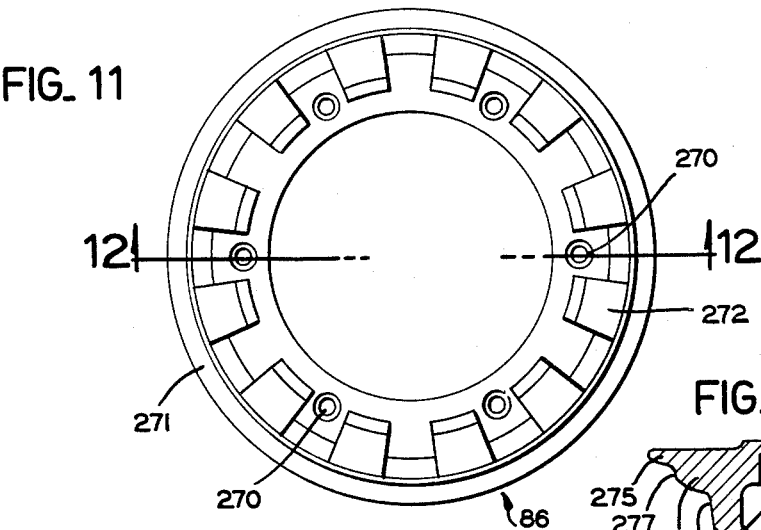
FIG. 11 is a top plan view of my bead ring structure.
Figure 12:
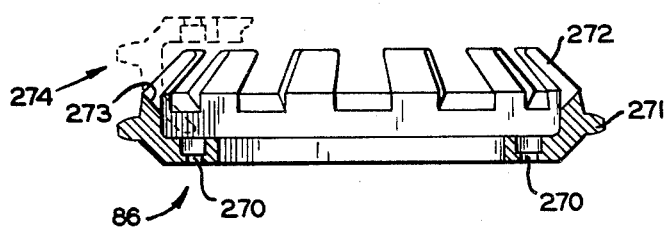
FIG. 12 is a sectional view taken on the line 12—12 of FIG. 11.

As seen in FIGS 11 and 12, the bead portion of my inflating assemblies may be bolted directly to such assemblies through bolt holes 270. Each of the rim devices has a tire bead-engaging flange 271 and is provided with a series of upstanding frusto-conically shaped guides 272 which serve to guide and center the tire when such bead rim devices are brought together thus automatically properly to seat the tire beads against the flanges 271. Intermediate such frusto-conically shaped guides 272, I provide a beveled surface as shown at 273 such that the bead rim devices may seat together in the manner shown in dotted lines in FIG. 11 at 274.

Figure 13:
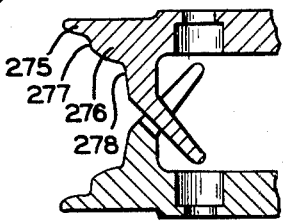
FIG. 13 is a sectional view of an alternative embodiment of my bead ring structure whereby tires of different diameters may be accommodated.

Referring now to the bead ring embodiment shown in FIG. 13, it may be seen that the bead engaging flange 275 may be provided with an offset shoulder 276 such that tires of 15″ diameter may seat on the outer portion 277 whereas, for example, 14″ tires may seat at 278. Thus tires of different sizes may be accommodated by the single bead ring structures shown in the FIG 13 embodiment.

OPERATION

Figure 6:
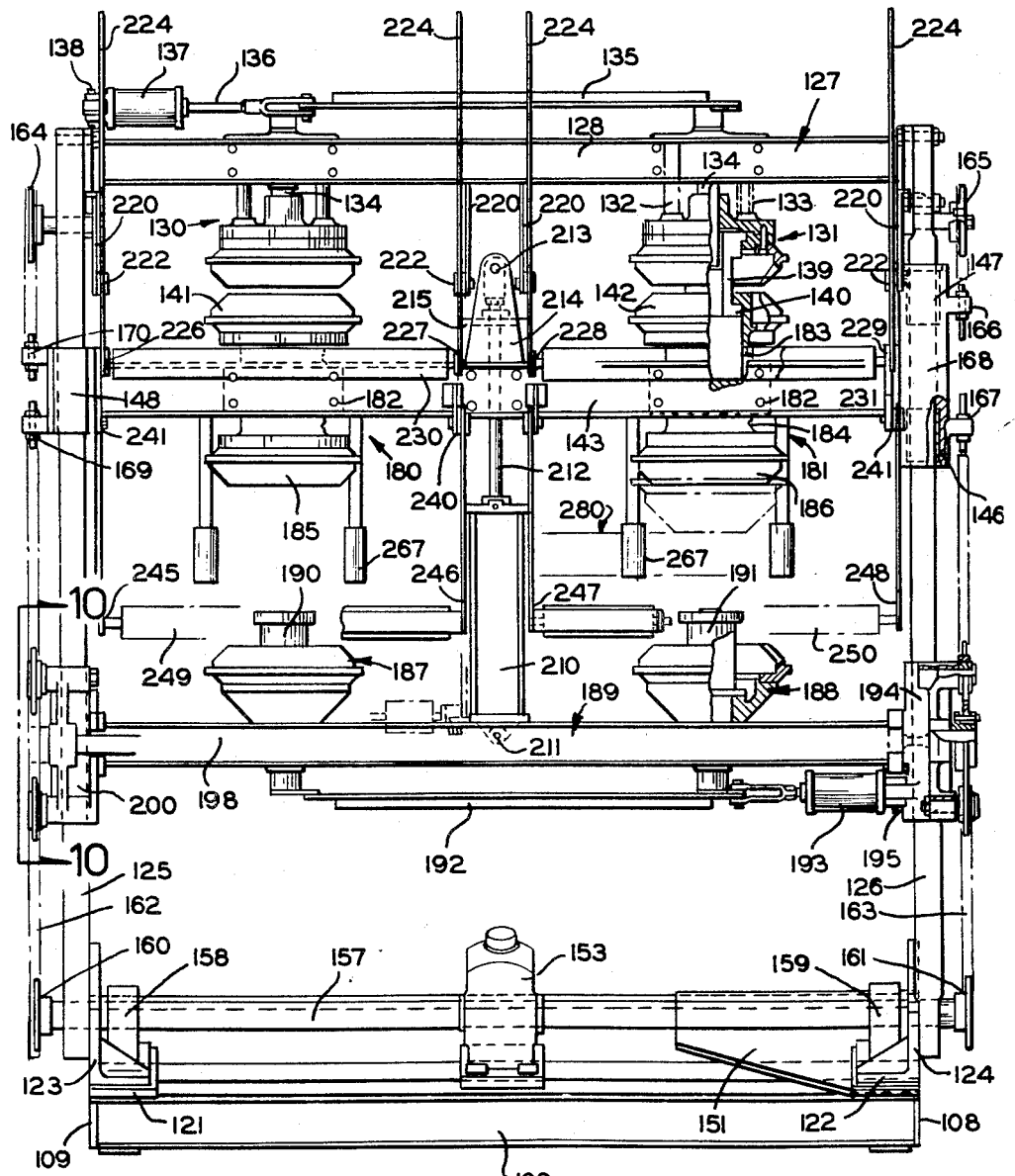
FIG. 6 is an end elevation of the embodiment shown in FIG. 5 as seen from the right thereof along the conveyor.
Figure 7:
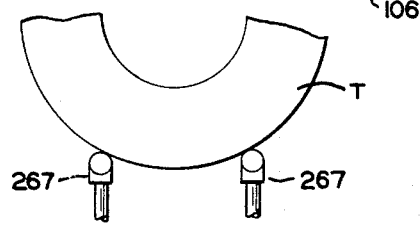
FIG. 7 is a fragmentary top plan view illustrating the position of a tire engaging the stops in my FIG. 5 embodiment.

Referring now to the operation of the preferred embodiment of my invention illustrated in FIGS. 5 through 10 inclusive, and with special reference to FIGS. 5 and 6, tires coming from the tire curing press on conveyor rollers 26 will roll onto the conveyor rollers 249 and 250 respectively to be stopped by the removable stops 267 and be substantially centered above the rim inflating assemblies 187 and 188. A suitable limit switch may then actuate the valve controlling pneumatic cylinder 210 to retract the same thus to raise the lower transverse frame 189 to cause the rim inflating assemblies 187 and 188 to lift the tires off the rollers 249 and 250. The bead rings on the rim inflating assemblies having a frusto-conical shape will automatically center the tires with respect thereto and the retraction of the cylinder 210 will raise the lower transverse frame 189 to the dotted line position shown at 280 in FIGS. 5 and 6. Once the projections 190 and 191 are within the hollow center portions of the rim inflating assemblies 180 and 181, the actuation of piston-cylinder assembly 193 will cause the rotation of such projections to provide the bayonet lock therewith. The hot tires that have just come from the tire curing press are now secured between the rim inflating assemblies of the intermediate and lower transverse frame members. As shown in FIG. 6, the bead rings will seat as shown at 273 in FIG. 11 to bring the tire beads fairly close together to provide the proper tensioning of the tread portion while the same may then be subjected to air under pressure through opening 184 to maintain such proper tensioning.

The rings in the illustrated FIG. 6 example enter the tire and compress such that the distance therebetween is approximately 1⅝″ completely sealing the tire against air leak. When the tire is inflated, one of the two mating rings will retract to space the rings approximately 5″ apart. The bayonet lock, of course, allows for this movement which is approximately 3⅜″ so that the tires will be inflated with the rims spaced approximately 5″ apart as measured from the outer parts of the beads. The springs 133 in the FIG. 6 embodiment hold the top bead ring in downward pressing position to compress the bead on the tires to the above-mentioned approximate 1⅝″ and then as the tire is inflated, these springs will compress to allow the beads to expand to the nominal rim size or about 5″ in width. It will, however, be seen that the bottom bead ring assemblies 187 and 188 are not mounted with such springs 133 as are the top bead structures since the cylinder 210 will give these bottom rings the required floating action that the springs 133 give to the top bead ring structures. However, it will be understood that, if desired, such springs may also be provided on the bottom rims.

Shortly prior to the end of the next cycle of the tire curing press, the piston-cylinder assembly 137 will be actuated to release the bayonet locks as shown at 140 in FIG. 6 such that the upper rim inflating assemblies on the intermediate transverse frame 143 may be moved away from the stationary or fixed rim inflating assemblies on the top transverse frame member. This is accomplished by actuation of the motor 150 to rotate shaft 157 to move the intermediate frame 143 downwardly and also, of course, the lower transverse frame therewith as a unit. The lowering of the intermediate frame 143 will cause the conveyor side frames 226 through 229 inclusive to drop therewith until the top of the slides or guides 224 and 225 contact the stops 222 and 223 thus effectually to raise the conveyor rollers 230 and 231 above the bead rings 141 and 142. The conveyor rollers 230 and 231 will then be positioned opposite the conveyor roller 226. It is noted that the piston-cylinder assembly 264 may be actuated to remove the stops 267 from the path of the lowering conveyor rollers 230 and 231. The cylinder will now be actuated to replace the stops 267 in the proper position to hold the next tires coming down the conveyor rollers 26 from the tire curing press.

A disc type brake 281 may be actuated simultaneously with the deenergization of the motor 150 thus to provide an accurate placement of the transverse frame member in response to the motor controls. In the lowermost position of the intermediate frame member, the lower frame member 189 will assume the dotted line position shown at 282 in FIG. 5.

As the next pair of tires comes from the dual tire press, they will roll down the discharge ramp onto the conveyor rollers 230 and 231 respectively to be halted by the stops 267. Once both tires have reached the proper position, a suitable limit switch will then energize motor 150 in a reverse direction to raise the transverse intermediate frame member 143 and, of course, the lower transverse frame member 189 holding two tires therebetween by retraction of piston-cylinder assembly 210. The frame members will continue upwardly with the bead rings 141 and 142 automatically centering the tire to be clamped between the assemblies on the upper and intermediate transverse frames. Continued upward movement of the intermediate frame member 143 will pick up the lost motion mounted conveyor rollers 230 and 231 until the entire unit is positioned substantially as shown in FIG. 6 with the lower transverse frame in the dotted line position shown at 280. Air under pressure may then be supplied through openings 183. In this manner, there will be four tires in my dual post inflation device subjected to air under pressure cooling at ambient temperature. After the upper and intermediate frame members are in the proper relative position, the piston-cylinder assembly 137 will be actuated to provide the bayonet lock therebetween.

Shortly prior to the end of the next cycle of the tire curing press, the piston-cylinder assembly 193 will be actuated to unlock the projections 190 and 191 and the piston-cylinder assembly 210 will be actuated to extend the rod 212 to lower the rim inflating assemblies 187 and 188 from the dotted line position shown at 280. The conveyor roller side frame members 245 through 248 inclusive will be raised off the lower frame member 189 as the result of the stops 242 engaging the tops of the slots 243 to position the rollers 249 and 250 opposite the discharge ramp roller 26. The raising of the rollers 249 and 250 with respect to the rim inflating assemblies 187 and 188 will automatically lift the tire thereon above the projections 190 and 191 and the piston-cylinder assembly 264 having been extended to remove the stops 267 from the path of the tires, such now cooled tires will roll freely from my dual post inflation device.

Again, retraction of the piston-cylinder assembly 264 will properly position the stops 267 to engage the next tires coming from the tire curing press such that the cycle just described may be repeated.

Figure 14:
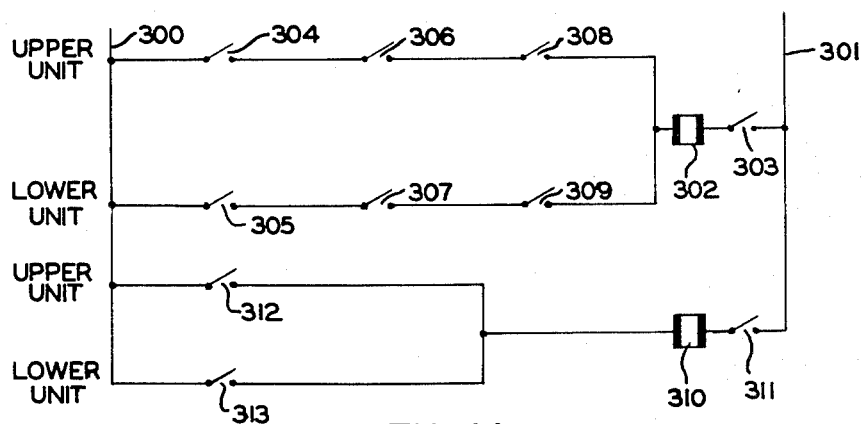
FIG. 14 is a fragmentary schematic circuit diagram illustrating the various interlocks that may be employed between my dual post-inflator and the tire press.

In FIG. 14, I have illustrated a simple schematic electrical circuit showing the interlock between the tire press and my dual post-inflation unit. Power lines 300 and 301 may be provided between which the components of my system are connected. A solenoid 302 may be employed to actuate the press tire ejector and such may be controlled by switching 303 operated in the usual manner as, for example, by the movement of the press itself and such is connected in series with a plurality of pairs of limit switches. One of each pair, of course, is for the respective upper and lower units of my dual post-inflation device and, for example, the switches 304 and 305 will be closed when the post-inflator is open and the switches 306 and 307 will be closed when the tire has been discharged from the unit. Such switches, of course, may take the form of treadle switches on the discharge conveyor or be placed in any other suitable location. Switches 308 and 309 are closed when the post-inflator is positioned to receive a cured tire. Accordingly, all of the switches 304 through 309 inclusive must be closed before the press tire ejector solenoid 302 may be energized. A solenoid 310 may be employed to start the cycle of the tire press to load and then close such press, such being operated by switching 311. Switches 312 and 313 in parallel with themselves but in series with the solenoid 310 may be closed when the ejected tires have been properly received by the post-inflator. Only when such has been accomplished can the cycle of the press then be started by the switching 311. It will, of course, be understood that the switching 303 and 311 will include the suitable relay and holding circuits required for the proper operation of the solenoids 302 and 310, but such are not illustrated in the present figure for purposes of convenience.

Whereas I have illustrated air being introduced laterally into my rim inflating assemblies on the central transverse frame members, it will be understood that such air may be introduced coaxially through the projections on the upper and lower rim inflating assemblies respectively. Moreover, in order to facilitate cooling, hoods and sprays may be provided in the manner similar to that illustrated in the above-mentioned copending application of Brundage et al. and for that matter the tires themselves may be slowly rotated while being cooled, if such water cooling is found desirable.

It will, of course, be understood that many forms of my invention may be utilized to replace one set of rim inflating assemblies with another such that the tire may be discharged from one and replaced by a new one while the other one is subject continually to cooling. For example, instead of reciprocating such units along an inclined guide, such may be rotated or conveyed about a central axis progressively to position each set of rim inflating assemblies in the proper loading and unloading position. Moreover, more than just two sets may be employed, depending upon the length of time required for cooling with respect to the cycle time of the tire curing press.

It will now be seen that I have provided a dual post inflator which will cool the hot tires which will still be vulcanizing somewhat after coming from the tire curing press at ambient temperature while yet maintaining such cords therein under tension to preclude the deleterious affects resulting when such nylon or like cords are not subject to tension while cooling.

Other modes of applying the principle of the invention may be employed, change being made as regards the details described, provided the features stated in any of the following claims or the equivalent of such be employed.

I, therefore, particularly point out and distinctly claim as my invention:

1. A dual post inflator for a tire curing press adapted to vulcanize nylon and like cord tires having a discharge path; comprising guide means extending normal to such discharge path, a fixed transverse frame extending between said guide means at the tops thereof, downwardly extending tire bead engaging rim inflating means mounted on said top transverse frame, an intermediate transverse frame mounted for reciprocation on said guide means and having oppositely extending tire bead engaging rim inflating means thereon, a lower transverse frame member mounted for reciprocation on said guide means and having upwardly extending tire bead engaging rim inflating means thereon, drive means to position said intermediate transverse frame member below such discharge path to enclose a tire coming from such tire curing press between said rim inflating means on said top transverse frame member and the opposite rim inflating means on said intermediate transverse frame member as said intermediate transverse frame member is moved upwardly along said guide means, drive means to position said lower transverse frame member below said discharge path to enclose a tire coming from such tire curing press between the rim inflating means on said intermediate transverse frame member and the opposite rim inflating means on said lower transverse frame member as said lower transverse frame member is moved upwardly along said guide means; and support means surrounding the respective rim inflating means on said intermediate and lower transverse frame members operative to support such tires to be thus enclosed, said first mentioned drive means being operative to move said intermediate transverse frame member and said lower transverse frame member downwardly along said guide means as a unit to discharge the tire between said upper and intermediate transverse frame members on said discharge path after the same has been cooled at ambient temperature.

2. The post inflator set forth in claim 1 including rotatable projections on the rim inflating means on said top and lower transverse frame members, and means operative to rotate said projections to provide a bayonet lock with the respective rim inflating means on said intermediate transverse frame members.

3. The post inflator set forth in claim 2 wherein said means to rotate said projections comprises piston-cylinder assemblies mounted on the respective upper and lower transverse frame members.

4. The post inflator set forth in claim 1 including stop means removably positioned in the discharge path of such tire curing press adapted to halt such tires in a position to be engaged by said rim inflating means.

5. In combination, a dual post inflator for a tire curing press having a discharge path comprising guide means extending substantially normal to such discharge path, a fixed transverse frame extending between said guides, tire bead engaging inflating means mounted on said fixed transverse frame, an intermediate transverse frame mounted for reciprocation on said guide means and having oppositely extending tire bead engaging inflating means thereon, a movable transverse frame member mounted for reciprocation on said guide means and having tire bead engaging inflating means thereon, drive means to position said intermediate transverse frame member to enclose a tire between said inflating means on said fixed transverse frame member and the opposed inflating means on said intermediate transverse frame member, drive means to position said movable transverse frame member to enclose a tire between the inflating means on said intermediate transverse frame member and the opposed inflating means on said movable transverse frame member as said movable transverse frame member is moved toward said intermediate transverse frame member along said guide means, and support means surrounding the respective inflating means on said movable and intermediate transverse frame members operative to support such tires to be thus enclosed, said first mentioned drive means being operative to move said intermediate transverse frame member and said movable transverse frame member along said guide means as a unit to discharge the tire between said fixed and intermediate transverse frame members onto such discharge path after the same has been cooled while removing the tire between said movable and intermediate transverse frame members from the discharge path.

6. The combination set forth in claim 5 wherein said support means further includes conveyor rollers mounted on said intermediate transverse frame member, and lost motion means connecting said conveyor rollers to said fixed transverse frame member to be positioned at such discharge path as said intermediate transverse frame member is moved along said guide means.

7. The combination set forth in claim 6 wherein said support means further includes conveyor rollers mounted on said movable transverse frame member, and lost motion means connecting said last mentioned conveyor rollers to said intermediate transverse frame member to be positioned at such discharge path when said intermediate and movable transverse frame members are separated.

8. The combination set forth in claim 5 wherein said first mentioned drive means includes a chain drive powered by a prime mover.

9. The combination set forth in claim 8 wherein said movable transverse frame member is mounted for movement toward and away from said intermediate transverse frame member by means of a piston-cylinder assembly, the rod of said assembly being connected to said intermediate transverse frame member and the cylinder being connected to said movable transverse frame member.

10. The combination set forth in claim 5 including rotatable projections on the rim inflating means on said fixed and movable transverse frame members, means operative to rotate said projections to provide a bayonet lock with the respective rim inflating means on said intermediate transverse frame member.

11. The combination set forth in claim 10 wherein said means to rotate said projections comprises piston-cylinder assemblies mounted on the respective fixed and movable transverse frame members.

12. In combination, a tire curing press adapted to vulcanize nylon or like cord tires having a discharge path; a post inflator for said tire curing press comprising guide means extending generally normal to such discharge path, a top frame member mounted on said guide means for movement therealong, an intermediate frame member mounted on said guide means for movement therealong and a lower frame member, tire bead engaging and inflating means on said frame members adapted to engage and seal tires supported on such discharge path therebetween parallel to said bead engaging and inflating means on relative movement of said frame members, drive means relatively to move said intermediate frame member with respect to said lower frame member to seal and inflate a tire therebetween, and drive means relatively to move said top frame member with respect to said intermediate frame member to seal and inflate a tire therebetween.

13. The combination set forth in claim 12 wherein said tire bead engaging and inflating means include opposed notched guide members adapted to interengage so that the bead engaging portions thereof may be moved substantially adjacent each other.

14. The combination set forth in claim 12 wherein said bead engaging and inflating means include opposed bead rings, bayonet lock means adapted to interconnect said bead rings to hold the same together, and means to actuate said lock means.

15. In a dual post inflator for use with a tire curing press adapted to vulcanize nylon and like cord tires and having a discharge path, first means including a pair of relatively movable tire bead engaging rims operative to receive a first tire discharged from such press to remove the same from such discharge path to subject such tire to cooling while the cords thereof are under tension at ambient temperature for a period substantially longer than the cycle time of such tire curing press, second means vertically spaced from said first means including a pair of relatively movable tire bead engaging rims operative to receive the next tire discharged from such press to remove the same from such discharge path to subject such next tire to cooling while the cords thereof are under tension at ambient temperature for a period substantially longer than the cycle time of such tire curing press, means mounting said first and second means for movement to and from a tire receiving position, said first means being operative to return such first tire to such discharge path after such next tire has been removed therefrom.

16. In post inflation mechanism for tires following vulcanization thereof, the combination of two vertically spaced members carrying tire bead engaging means directed toward each other, a third member located between said two first named members and carrying oppositely directed tire bead engaging means fixed with respect to each other and aligned with said tire bead engaging means carried by said two first named members, substantially horizontally extending support means operative to support a tire parallel to said bead engaging means to be engaged thereby, and means mounting at least two of said three members for reciprocable movement whereby the tire bead engaging means carried by said two first named members will cooperate with the tire bead engaging means carried by said third member to retain tires therebetween.

17. In a dual post inflator for use with a tire curing press adapted to vulcanize nylon and like cord tires and having a discharge path, the combination of two horizontally extending members substantially vertically spaced and carrying tire bead engaging means directed toward each other, a third member located between said two first named members and carrying oppositely directed tire bead engaging means fixed with respect to each other and adapted to cooperate with the tire bead engaging means carried by said two first named members to retain tires discharged from such press therebetween, a tire support operative to hold a tire parallel to such discharge path and accordingly parallel to said bead engaging means to be engaged thereby, and substantially vertical guide means extending normal to such discharge path to facilitate relative reciprocable movement of said three members whereby the tire bead engaging means carried by said two first named members will cooperate with the tire bead engaging means carried by said third member to retain tires therebetween.

18. The combination with a tire vulcanizing press having a conveyor path for discharging vulcanized tires therefrom, of a post inflator comprising two vertically spaced sets of relatively movable tire bead engaging rims operative to receive such tires therebetween and remove such tires from said path, means mounting said sets of relatively movable tire bead engaging rims for movement alternately into position to receive therebetween successive tires as they are thus discharged from said vulcanizing press and to return the first of such successive tires to said path after the next tire has been removed therefrom, and tire support means for said sets of tire bead engaging rims operative to support such tires parallel thereto to be received thereby.

19. Apparatus for holding and inflating tires during a cooling period following vulcanization, comprising, a support for a tire, said support having an upwardly opening transverse passage, a stationary member adjacent said support, a carriage, said carriage having center frame movably carried by said stationary member, two closure pairs vertically aligned with said support, each closure pair comprising opposed members having a seat to engage a tire bead, one member of each closure pair being mounted on said carriage center frame and the other member of said pairs being mounted for relative movement toward and away from the first member of each pair, means to selectively move one of said movable members away from said center frame into said support passage so that the closure members will be separated one below and one above the plane of said support, means to position a tire on said support in alignment with said separated closure members, means to inflate a tire clamped between said closure members above said support, and means to move said carriage when said tire is inflated.

20. Apparatus for holding and inflating tires during a cooling period following vulcanization, comprising, a support path for such tire, a stationary member adjacent said support path, a carriage movably carried by said stationary member, two closure pairs vertically aligned with said support path, each closure pair comprising opposed members having a seat to engage a tire bead, one member of each closure pair being mounted on said carriage and the other member of said pairs being mounted for relative movement toward and away from the said one member of each pair, means selectively to move one of said movable members away from said carriage and beneath said support path so that the closure members will be separated one below and one above the plane of said support path, means to position a tire on said support path in alignment with said separated closure members, means to close said closure members and inflate a tire clamped therebetween and means to move said carriage when such tire is inflated to move such tire from such support path.

21. A tire inflating machine adapted to transfer tires between a loading station and a storage station comprising in combination a movable inflation support, a pair of tire chucks each including a first chuck half mounted on said support and a mating chuck half separable from the first half and from said support whereby tires may be clamped between the halves of each pair of tire chucks, and means for moving said support selectively to two positions in each of which positions one chuck is at a loading station and the other chuck is at a storage station.

22. The combination with a tire vulcanizing press having a conveyor path for discharging vulcanized tires therefrom, of a post inflator comprising a plurality of spaced sets of relatively movable tire bead engaging rims operative to receive such tires therebetween and remove such tires from said path, and means mounting said sets of relatively movable tire bead engaging rims for movement sequentially into position to receive therebetween successive tires as they are thus discharged from said vulcanizing press and to remove such tires from said path and to return the first of such successive tires to said path after the next tire has been removed therefrom.

References Cited by the Examiner

UNITED STATES PATENTS

| | | | |
|---|---|---|---|
| 2,672,669 | 3/54 | Davis | 25—103 XR |
| 2,850,768 | 9/58 | Elrick et al. | 18—45 |
| 2,859,502 | 11/58 | Brown. | |
| 2,963,737 | 12/60 | Soderquist | 18—2 |
| 2,978,741 | 4/61 | Soderquist | 18—2 |
| 2,988,780 | 6/61 | Dennis et al. | 18—45 |
| 3,075,237 | 1/63 | Soderquist | 18—2 |

FOREIGN PATENTS

1580/56   1/57   Union of South Africa.

WILLIAM J. STEPHENSON, *Primary Examiner.*

MICHAEL V. BRINDISI, *Examiner.*